United States Patent
Zimmerman et al.

(10) Patent No.: US 7,298,268 B2
(45) Date of Patent: Nov. 20, 2007

(54) READ AUTHENTICATION METHOD AND SYSTEM FOR SECURING DATA STORED ON RFID TAGS

(75) Inventors: Timothy J. Zimmerman, Waxhaw, NC (US); Kelly J. Ungs, Marion, IA (US)

(73) Assignee: Intermec IP Corp., Everett, WA (US)

( * ) Notice: Subject to any disclaimer, the term of this patent is extended or adjusted under 35 U.S.C. 154(b) by 245 days.

(21) Appl. No.: 11/131,100

(22) Filed: May 17, 2005

(65) Prior Publication Data

US 2006/0261926 A1    Nov. 23, 2006

(51) Int. Cl.
*G08B 13/14* (2006.01)
(52) U.S. Cl. ............... 340/572.1; 340/539.1; 340/572.4; 340/5.26
(58) Field of Classification Search ............ 340/572.1, 340/539.1, 572.4
See application file for complete search history.

(56) References Cited

U.S. PATENT DOCUMENTS 6,130,622 A * 10/2000 Hussey et al. ............ 340/5.61
2005/0278222 A1* 12/2005 Nortrup ..................... 705/17

* cited by examiner

*Primary Examiner*—Benjamin C. Lee
*Assistant Examiner*—Travis R. Hunnings
(74) *Attorney, Agent, or Firm*—Shook, Hardy & Bacon L.L.P.

(57) ABSTRACT

A system and method for limiting the reading out of data from an RFID tag by requiring a reader of the tag to be authenticated by providing the correct key to the tag, static or rotating, before the tag will transmit data. The limitation of transmission is done irrespective of whether the data is encrypted or not. The system and method may have a segmented or tiered access scheme where segments or portions of the data stored in the RFID tag are accessible by differing keys. Additionally, different encryption keys or schemes may be employed to provide differing encryption methods for the data in the differing segments or portions of the data stored in the RFID tag.

2 Claims, 3 Drawing Sheets

READ AUTHENTICATION METHOD AND SYSTEM FOR SECURING DATA STORED ON RFID TAGS

FIELD OF THE INVENTION

One embodiment relates to RFID tags and the systems and methods used to write, read, encrypt, lock and access such RFID tags.

BACKGROUND OF THE INVENTION

In the past, RFID tags have used data encryption techniques to restrict unauthorized access of information stored on such tags.

Additionally, authentication techniques have been used to selectively grant write and lock privileges for some RFID tags.

However, while such attempts have been employed to restrict use of RFID tag information, they do not meet all the needs in the industry. In many examples of RFID tags, the tags are embedded into products, and thereafter they are widely dispersed. For many of these applications, there is no practical way to limit or restrict unwanted users from interrogating RFID tags after they have been embedded in a product which leaves the influence of the entity entering or having responsibility for the information. Encryption of the data on the tags has been used to limit access to the underlying information. However, it is well known that the more opportunities one has to sample examples of coded or encrypted information, the easier it is to crack the code and break into the encryption scheme. Many users of RFID tags would like to better secure their data stored on RFID tags after the tags have been widely dispersed.

Consequently, there exists a need for improved systems and methods for protecting the security of information stored on RFID tags.

SUMMARY OF THE INVENTION

It is an object of one embodiment to provide a system and method for improving the security of information stored on and read out by RFID tags in an efficient manner.

It is a feature of one embodiment to utilize a pre-read authentication scheme to restrict transmission of data from an RFID tag to only authorized recipients.

It is an advantage of one embodiment to achieve improved security by limiting unauthorized access to data (albeit encrypted) from RFID tags and the resulting illicit use of such encrypted data to crack encryption codes which are employed for protecting said information.

The present invention is a system and method for restricting users from reading data both encrypted and unencrypted, from an RFID tag without first being authenticated as a proper recipient of such data, which system is designed to satisfy the aforementioned needs, provide the previously stated objects, include the above-listed features, and achieve the already articulated advantages. One embodiment is carried out in a "free tag access-less system" in a sense that the ordinary free access to interrogate and receive transmission of data (albeit often encrypted) from RFID tags, has been greatly reduced.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
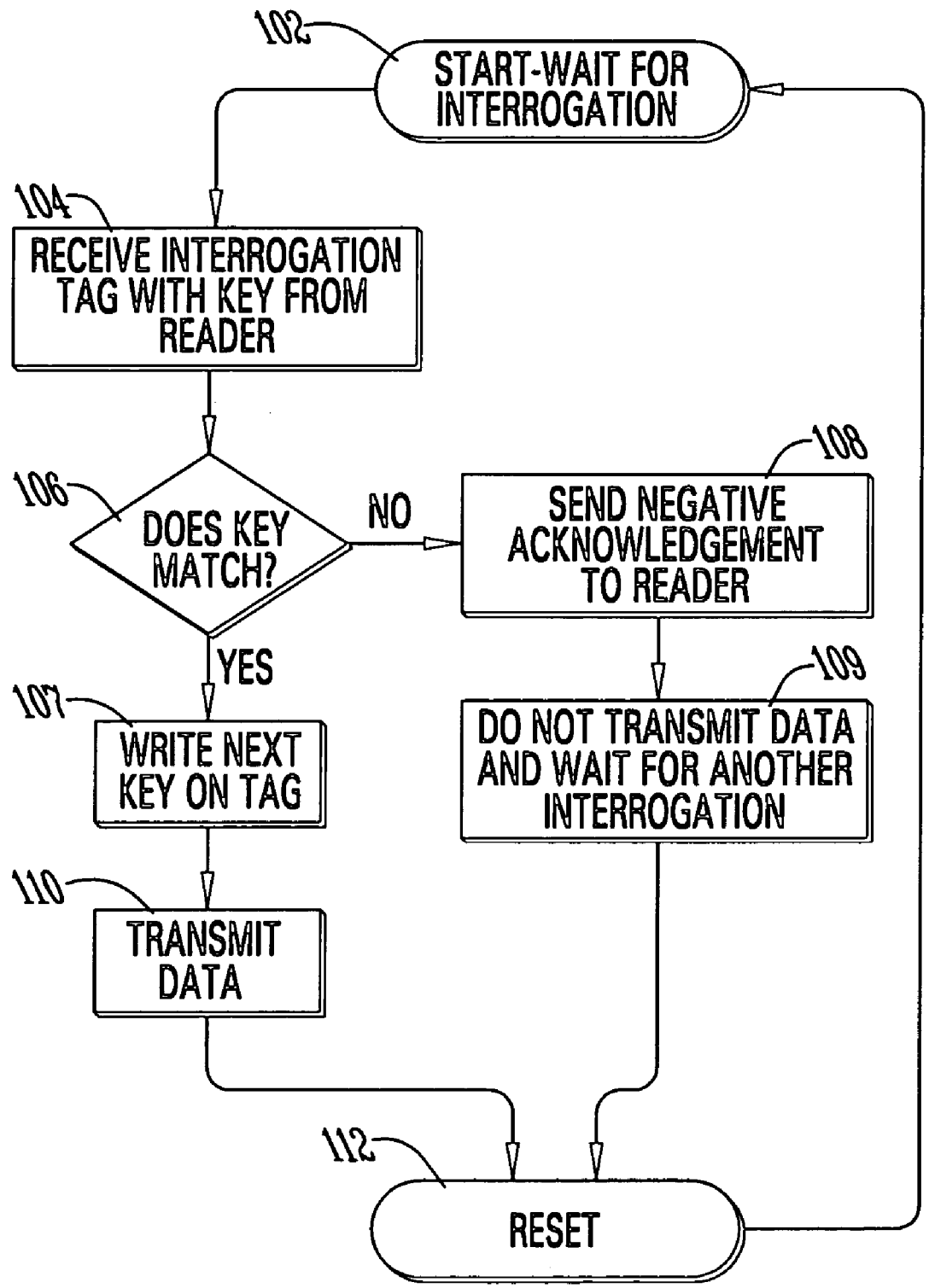
FIG. 1 is a flow diagram of a process and system of the present invention, where transmission of data by the RFID tag involves a requirement to authenticate the reader's authority to access the data prior to transmission of any data whether it is encrypted or not.

Now referring to the drawings wherein like numerals refer to like matter throughout, and more specifically referring to FIG. 1, there is shown a flow diagram of the system of the present invention.

Figure 2:
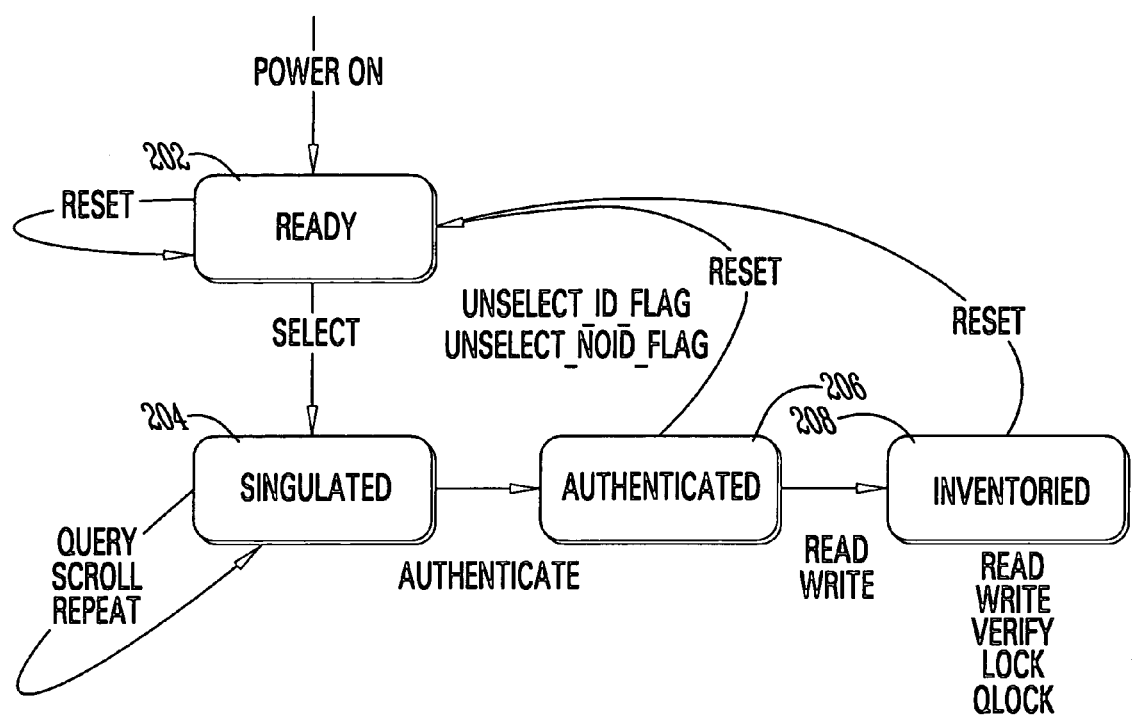
FIG. 2 is a simplified block diagram description of a modified state diagram for RFID tag of the type used to perform the authentication function of the present invention.

The process of one embodiment will be implemented within an RFID tag, which is well known in the art. Minor changes to the state diagram of the RFID tag will accomplish the necessary functions of the present invention. One prior art RFID tag that could be readily adapted to carry out one embodiment is the SL2 ICS10 I Code EPC Smart Label Integrated Circuit by Philips Electronics. Other RFID tags could be used as well. The aforementioned Philips RFID tag is provided merely as an example. FIG. 2 (discussed below) provides some changes to the state diagram of such an RFID tag as would be helpful in carrying out the new features of the present invention.

In general, the novel process of one embodiment would be as follows:

Step 102: The RFID tag waits for an interrogation to occur.

Step 104: The RFID tag receives an interrogation tag from a tag reader.

Step 106: If the interrogation tag contains the appropriate key (see discussion below), then:

Step 107 is as follows: the Next Key is written on the information to be transmitted by the tag and the process proceeds to Step 110 (transmit data).

However, if the Key does not match in Step 106, then the next key is not written and instead the process proceeds to:

Step 108 which is that a negative acknowledgment is sent to the reader.

But in accordance with Step 109, no user data (whether encrypted or not) is transmitted to the reader.

After the data has been sent per Step 110 or the data is not sent per Step 109, the RFID tag resets itself and again awaits an interrogation to occur and the process repeats with Step 102.

An alternate embodiment of the present invention may substitute a tiered or segmented access approach for the simple authorized/not authorized approach discussed above. In a tier access approach, multiple passwords or keys can be used to access segmented regions of the information stored on the tag. For example, one key may provide limited access to information requiring minimal security, while another different key or password may give more detailed information. This system can be used to provide varying information to the various users in a product distribution channel. For example, a retail customer may have the ability to access information from an in-store reader which provides a predetermined key; the information would be targeted to what the customer would typically want to know, price, date of manufacture, expiration date, etc. The retailer may desire additional or different information relating to cost, date it was acquired by the retailer, etc. A distributor may want to track yet different information, different cost, manufacturer sales incentives, etc. A tiered or segmented tag system would allow more users to benefit from some of the information on the tag while protecting certain predetermined information from being available to others.

In this segmented data embodiment of the present invention, differing data encryption schemes can be deployed for differing segments of the tag. For example, no encryption might be employed on the data stored in the tag which is to be read by the retail customer; the data to be read only by the retailer may employ a first data encryption scheme; and the data to be read by a distributor may employ a second and different data encryption scheme. Utilizing the segmented data with differing encryption schemes, one of the goals of one embodiment is to limit the ability for unauthorized users to have access to encrypted data from which they could attempt to decrypt the data. The differing data encryption schemes may be just using the same system of the program to encrypt data and using different keys, or it may be utilizing different programs and methods to encrypt the data.

A more detailed understanding of a particular possible implementation of the present invention can be achieved by now referring to FIG. 2, which generally shows a more detailed view of a possible state diagram of an RFID tag which could implement the present invention. RFID tags may have a Lockable State Machine which is used to refer to locking; i.e., fixing of certain data by the state machine or microprocessor and not the prohibiting transmission of data which is the novel feature of the present invention. In prior art Lockable State Machines, the data was still transmitted even if it were locked or fixed. The State Machine in the above-referenced Philips RFID tag is not a lockable State Machine, and its implementation of the process outlined in FIG. 1 would be straight forward and within the skill of one in the art. FIG. 2 is directed to the more complex locking State Machines. The step 202 represents a ready state where the integrated circuit is ready to accept incoming data after it has been reset from the prior process implementation. Step 204 is the process of separating queries from multiple RFID readers or multiple attempts by the same reader. Step 206 is where the authentication step of one embodiment would occur. Here, rotating keys can be deployed such as are typical with WEP keys in providing security for wireless LANs. The next key can be transmitted with the data so the reader can maintain an updated key.

Step 208 is the inventorying of the available options that exist after the authentication occurs. In general, any RFID tag could be made to implement one embodiment by disabling all READ and WRITE (including those which are controlled via privileges, etc.) functions except the authentication functions until the reader has been authenticated and, therefore, authorized to receive any data irrespective of whether it is encrypted or not.

Figure 3:
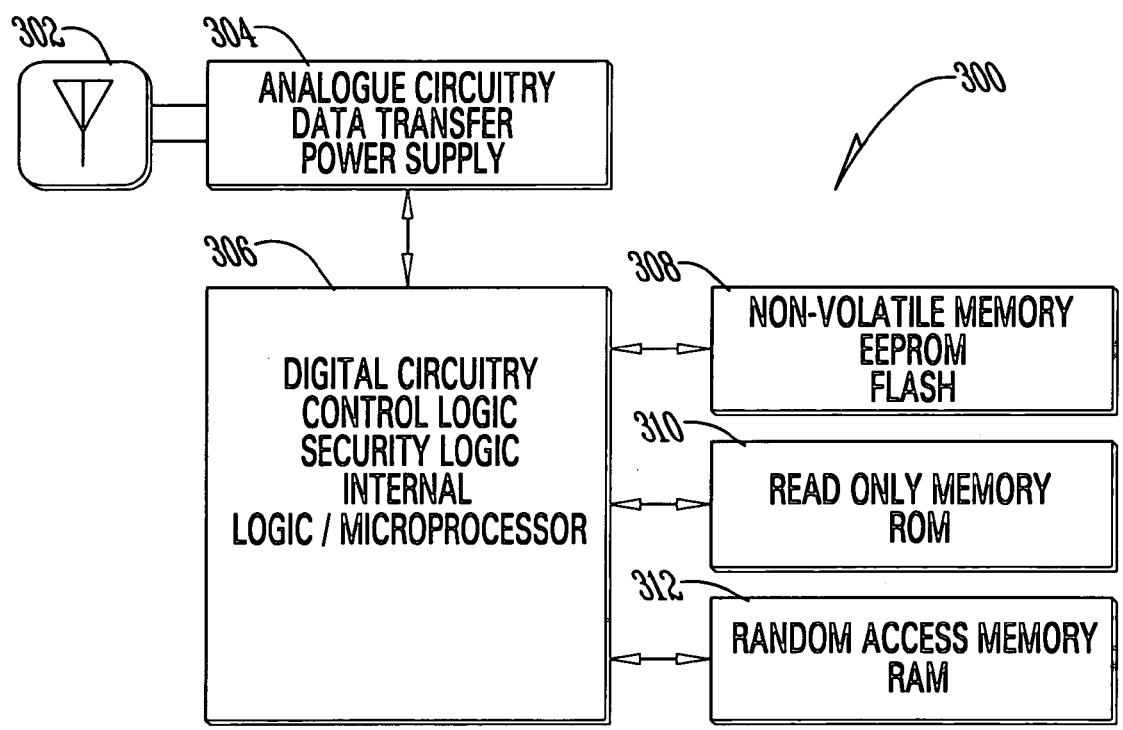
FIG. 3 is a simplified schematic block diagram of the hardware of an RFID tag which is configured to control the authentication processes of the present invention.

A more thorough understanding of the present invention can be obtained by now referring to FIG. 3, which shows a diagram of the hardware of a representative RFID tag, generally designated 300, which is configured to perform the present invention. The tag 300 includes an RFID tag antenna 302 which receives signals from and transmits signals to a reader (not shown). RFID tag analog circuitry 304 provides for data transfer (and power supply in an active RFID tag). Digital circuitry 306 can be many types of digital circuitry, including dedicated logic devices, gate arrays, a microprocessor or other digital signal processing circuitry, together with any necessary software. RFID tag digital circuitry 306 provides the control logic and security logic for the RFID tag 300. RFID tag digital circuitry 306 communicates with RFID tag non-volatile memory (EEPROM/FLASH), RFID tag ROM 310, and RFID tag RAM 312. The process of one embodiment can be carried out by the control logic circuitry or the microprocessor in conjunction with software and data stored in the various forms of memory typically found in an RFID tag. The details of this RFID tag are merely exemplary of the various tags which could be utilized by a person skilled in the art. It is the intention of the present invention to cover any type of hardware or software combination which performs the functions of the present invention.

A more detailed understanding of one embodiment can be achieved by reviewing the table below which shows a Tag memory architecture suitable for the present invention. Predetermined segments of the user data segment can be used to store the keys used for authentication. The Tag Memory Layout field can be used to identify those segments of the user data which contain the keys and the Next Keys.

| | Bytes | Field Name | Written | Locked |
|---|---|---|---|---|
| Unique Value[1] | 0-7 | Tag ID | Mfg. | Mfg. |
| Memory Type & Size[2] | 8-9 | Tag Manufacturer | Mfg. | Mfg. |
| | 10, 11 | Tag Hardware Type | Mfg. | Mfg. |
| Tag Application and Data Presentation[3] | 12-17 | Tag Memory Layout | Mfg. or Application | As required by Application |
| User Data | 18-127 | User Data | Application | As required |

[1]Allows for * 2 ^ 64 = 18,446,744,073,709,551,616 unique tags; ISO Standards
[2]Allows different tag types and tag vendors to interoperate; ISO Standards
[3]Allows tags from different user communities and their application requirements (e.g., different functional and data storage requirements) to co-exist without interfering with each other; ISO & Contributing User Community Organizations Throughout this description, numerous references are made to "RFID" which is intended to mean radio frequency identification, which is a well-known term which is understood in the industry. Unless otherwise stated, the term "RFID tags" as used herein is intended to refer to both passive RFID tags (those without a power supply) and active RFID tags (those with a power supply/battery).

Throughout this description, references were made to retail customer, retailer, distributor, etc. These references are intended to be merely examples of types of users which might have access to differing segments of data. The present invention is not intended to be limited just to such a distribution channel or to a distribution channel at all.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A process for maintaining security of information stored on a radio frequency identification (RFID) tag comprising the steps of:
   storing predetermined data on an RFID tag wherein said predetermined data is variable and includes therein information relating to a next key to be used in a rotating key authenticating system;
   interrogating said RFID tag with an RFID tag reader by providing a requesting key to said RFID tag, wherein said requesting key is a changing key in the rotating key authentication system;
   comparing said requesting key to a predetermined stored key and determining if a match exists;
   transmitting said predetermined data in response to and only if said match exists;
   determining if a particular reader is authorized to write to and lock predetermined portions of said predetermined data; wherein said determining if a particular reader is authorized to write is a separate and distinct process from said determining if a match exists.

2. A system for selectively transmitting information from an RFID tag comprising:
   means for storing and transmitting, via an RF signal, predetermined data in a plurality of predetermined segmented regions;
   means for interrogating said means for storing and transmitting;
   said means for interrogating providing a requesting key;
   said means for storing and transmitting being configured for receiving said requesting key and in response thereto determining which, if any, of said plurality of predetermined segmented regions can be accessed by said means for interrogating;
   said means for storing and transmitting being further configured to transmit data from all of said predetermined segmented regions in response to receipt of a master key and further configured to transmit data from less than all of said predetermined segmented regions in response to receipt of an authorized key which is not a master key;
   said means for storing and transmitting being further configured to transmit a rotating key to enable increased security by changing keys which permit access to data in said predetermined segmented regions;
   said means for storing and transmitting data being further configured to transmit from a first subset of said predetermined segmented regions only encrypted data which has been encrypted using a first encryption scheme and to transmit from a second subset of said predetermined segmented regions only encrypted data which has been encrypted using a second encryption scheme which is different from said first encryption scheme.

* * * * *